(12) United States Patent
Kuroki et al.

(10) Patent No.: US 10,099,409 B2
(45) Date of Patent: Oct. 16, 2018

(54) MOLD, METHOD FOR MANUFACTURING MOLDED FOAM BODY, AND MOLDED FOAM BODY

(71) Applicant: BRIDGESTONE CORPORATION, Chuo-ku, Tokyo (JP)

(72) Inventors: Hiroyuki Kuroki, Yokohama (JP); Teruo Iwai, Yokohama (JP); Taisuke Yonezawa, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 637 days.

(21) Appl. No.: 14/378,046

(22) PCT Filed: Feb. 6, 2013

(86) PCT No.: PCT/JP2013/052675
§ 371 (c)(1),
(2) Date: Aug. 11, 2014

(87) PCT Pub. No.: WO2013/121941
PCT Pub. Date: Aug. 22, 2013

(65) Prior Publication Data
US 2015/0001754 A1    Jan. 1, 2015

(30) Foreign Application Priority Data
Feb. 13, 2012   (JP) .................... 2012-028460

(51) Int. Cl.
*B29C 44/12* (2006.01)
*B29C 39/10* (2006.01)
(Continued)

(52) U.S. Cl.
CPC .......... *B29C 44/12* (2013.01); *B29C 33/0038* (2013.01); *B29C 39/10* (2013.01);
(Continued)

(58) Field of Classification Search
CPC ..... B29C 33/12; B29C 33/0038; B29C 44/12; B29C 44/143; B29C 39/10; B29C 44/1214; B29C 44/1271
See application file for complete search history.

(56) References Cited

U.S. PATENT DOCUMENTS 3,833,694 A * 9/1974 Hughes ................. B29C 44/428
264/316
4,120,632 A * 10/1978 Stoeberl ............. B29C 33/0038
264/46.6

(Continued)

FOREIGN PATENT DOCUMENTS

JP         02112410 U     9/1990
JP       2010017962 A     1/2010
(Continued)

OTHER PUBLICATIONS

Communication dated Aug. 4, 2015 from the Japanese Patent Office in counterpart application No. 2012-028460.
(Continued)

*Primary Examiner* — Yogendra N Gupta
*Assistant Examiner* — Emmanuel S Luk
(74) *Attorney, Agent, or Firm* — Sughrue Mion, PLLC (57) ABSTRACT

A mold that: makes it possible to manufacture a molded foam body wherein a reinforcing member extends to a portion of an outer face of the molded body main body that corresponds to a parting line in the inner face of the cavity of the mold; and prevents molding problems stemming from the reinforcing member getting into the aforementioned parting line. Also: a method for manufacturing a molded foam body using the aforementioned mold; and a molded foam body manufactured thereby. A recessed step portion (6) that faces the cavity (4) of the aforementioned mold (1) is provided in the mating face (3*a*) of at least one part (3) of said mold (1), at at least a portion of the parting line (P)

(Continued)

(formed in the inner face of the cavity (4)) adjacent to which the reinforcing member (22) is disposed. Said recessed step portion (6) is designed such that if the reinforcing member (22) gets in between the mating faces (2a, 3a) at the parting line (P) when the mold is fastened, said reinforcing member (22) can escape into the recessed step portion (6).

8 Claims, 9 Drawing Sheets (51) Int. Cl.
  *B29C 44/14* (2006.01)
  *B29C 33/00* (2006.01)
  *B29C 33/12* (2006.01)
  *B29L 31/00* (2006.01)
  *B29K 101/00* (2006.01)
  *B29K 301/00* (2006.01)

(52) U.S. Cl.
  CPC ............ *B29C 44/143* (2013.01); *B29C 33/12* (2013.01); *B29K 2101/00* (2013.01); *B29K 2301/00* (2013.01); *B29L 2031/771* (2013.01); *Y10T 428/249953* (2015.04)

(56) References Cited

U.S. PATENT DOCUMENTS

| | | | | |
|---|---|---|---|---|
| 4,420,447 A * | 12/1983 | Nakashima | ............ | B29C 33/12 249/172 |
| 4,831,697 A * | 5/1989 | Urai | ............ | B29C 44/143 29/458 |
| 4,968,235 A * | 11/1990 | Nakane | ............ | B29C 33/14 249/93 |
| 5,013,090 A * | 5/1991 | Matsuura | ............ | A47C 7/18 264/275 |
| 5,017,115 A * | 5/1991 | Yanagishita | ............ | B29C 33/12 249/93 |
| 5,096,403 A * | 3/1992 | Yanagishita | ............ | B29C 33/0033 249/175 |
| 5,102,322 A * | 4/1992 | Yanagishita | ............ | B29C 44/143 249/142 |
| 5,130,074 A * | 7/1992 | Sakamoto | ............ | B29C 44/56 264/259 |
| 5,183,693 A * | 2/1993 | Rhodes, Jr. | ............ | B29C 33/14 249/94 |
| 5,225,261 A * | 7/1993 | Kargarzadeh | ............ | B29C 33/0038 264/245 |
| 5,500,168 A * | 3/1996 | Suzuki | ............ | B29C 33/14 264/278 |
| 5,500,169 A * | 3/1996 | Kondo | ............ | B29C 33/14 264/46.5 |
| 5,558,731 A * | 9/1996 | Labrie | ............ | B29C 44/12 156/182 |
| 5,759,588 A * | 6/1998 | Harada | ............ | B29C 33/12 264/266 |
| 5,783,228 A * | 7/1998 | Holmes | ............ | B29C 33/12 425/177 |
| 8,276,978 B2 * | 10/2012 | Stachura | ............ | B29C 44/1238 296/191 |
| 2003/0037500 A1* | 2/2003 | Bohm | ............ | B29C 44/143 52/309.8 |
| 2003/0129377 A1* | 7/2003 | Holmes | ............ | B29C 33/12 428/304.4 |
| 2003/0152748 A1* | 8/2003 | Schonebeck | ............ | B29C 44/12 428/143 |
| 2003/0161989 A1* | 8/2003 | Funakoshi | ............ | B29C 44/12 428/71 |
| 2003/0219554 A1* | 11/2003 | Wang | ............ | B29C 44/12 428/34.1 |
| 2004/0075184 A1* | 4/2004 | Brown | ............ | B29C 44/425 264/45.1 |
| 2004/0115417 A1* | 6/2004 | Fischer | ............ | B29C 44/12 428/304.4 |
| 2005/0053683 A1* | 3/2005 | Park | ............ | B29C 33/0038 425/4 R |
| 2005/0173821 A1* | 8/2005 | Liu | ............ | B29D 35/142 264/45.1 |
| 2005/0184420 A1* | 8/2005 | Biewer | ............ | B29C 44/10 264/51 |
| 2007/0075464 A1* | 4/2007 | Furuta | ............ | B29C 33/12 264/510 |
| 2007/0145634 A1* | 6/2007 | Rawlings | ............ | B29C 33/0038 264/219 |
| 2007/0148411 A1* | 6/2007 | Yamada | ............ | B29C 44/0461 428/172 |
| 2008/0026093 A1* | 1/2008 | Osaki | ............ | B22C 9/00 425/470 |
| 2014/0061964 A1* | 3/2014 | Liang | ............ | B29C 44/12 264/46.4 |
| 2014/0061980 A1* | 3/2014 | Kobayashi | ............ | B29C 45/561 264/500 |
| 2014/0079940 A1* | 3/2014 | Liyanage | ............ | B29C 44/1261 428/304.4 |
| 2015/0011666 A1* | 1/2015 | McEvoy | ............ | B29C 67/246 521/170 |
| 2017/0072607 A1* | 3/2017 | Ito | ............ | B29C 45/14262 |

FOREIGN PATENT DOCUMENTS

| | | | |
|---|---|---|---|
| JP | 2010-29276 A | * | 2/2010 |
| JP | 2010-29276 A | | 2/2010 |
| JP | 2011110798 A | | 6/2011 |

OTHER PUBLICATIONS

International Search Report for PCT/JP2013/052675 dated May 14, 2013.
Written Opinion for PCT/JP2013/052675 dated May 14, 2013.

* cited by examiner

MOLD, METHOD FOR MANUFACTURING MOLDED FOAM BODY, AND MOLDED FOAM BODY

CROSS REFERENCE TO RELATED APPLICATIONS

This application is a National Stage of International Application No. PCT/JP2013/052675 filed Feb. 6, 2013, claiming priority based on Japanese Patent Application No. 2012-028460 filed Feb. 13, 2012, the contents of all of which are incorporated herein by reference in their entirety.

TECHNICAL FIELD

The present invention relates to a mold for manufacturing a molded foam body in which a reinforcement member is disposed across at least a portion of an outer face of a molded body main body formed from a foamable synthetic resin, and the reinforcement member is integrated with the molded body main body, and relates in particular to a mold in which the molded body main body is molded, and the reinforcement member and the molded body main body are integrated together by foaming the foamable synthetic resin raw material inside a cavity, in a state in which the reinforcement member is disposed across an inner face of the cavity. The present invention also relates to a manufacturing method for a molded foam body using the mold, and a molded foam body manufactured by the manufacturing method.

BACKGROUND ART

Seats, such as vehicle seats or household sofas, are configured using a seat pad formed from a foamable synthetic resin, such as a flexible polyurethane foam or a semi-rigid polyurethane foam.

Figure 10:
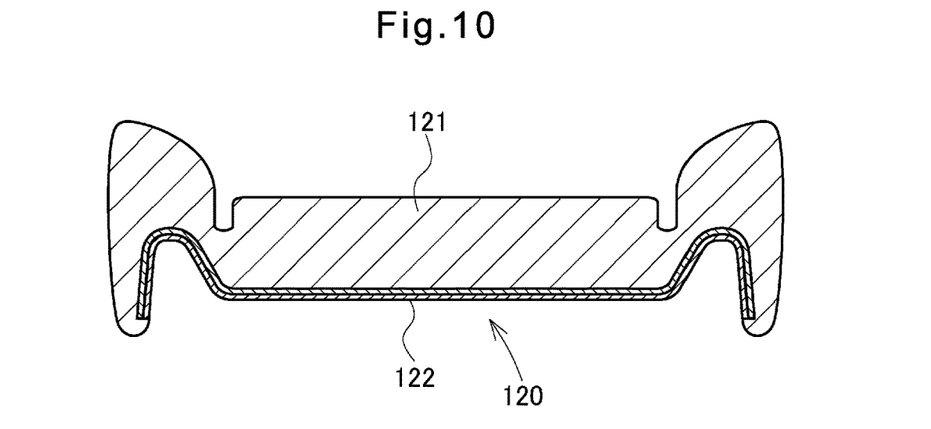
FIG. 10 is a cross-section view of a seat pad according to a conventional example.
Figure 11:
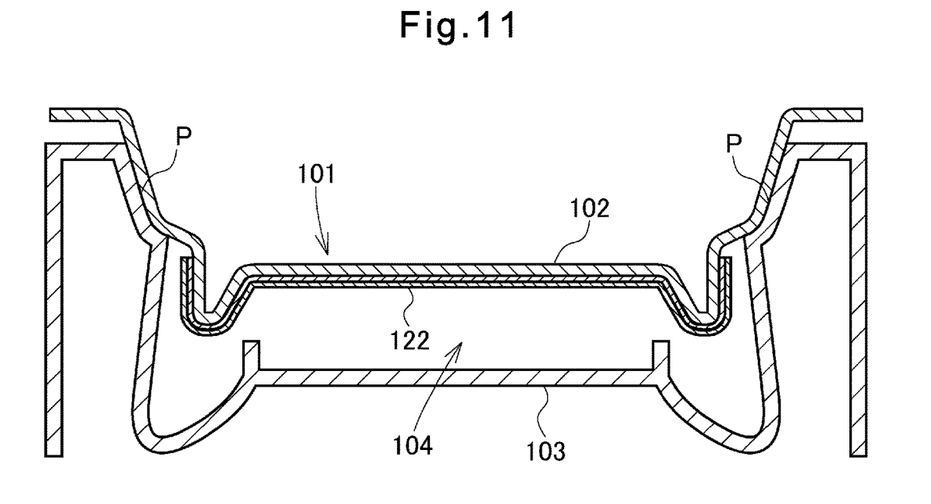
FIG. 11 is a cross-section view of a seat pad manufacturing mold according to a conventional example.

A reinforcement member is sometimes provided to an outer face of the seat pad in order to reinforce the seat pad (Patent Document 1). FIG. 10 is a cross-section view illustrating a conventional example of a seat pad with a reinforcement member, and FIG. 11 is a cross-section view illustrating a conventional example of a mold for manufacturing the seat pad with a reinforcement member. Note that FIGS. 10, 11 illustrate substantially the same content as FIGS. 1, 2 of Patent Document 1.

A seat pad 120 as illustrated in FIG. 10 includes a seat pad main body 121 comprising a foamable synthetic resin such as a polyurethane foam, and a reinforcement member 122 disposed across an opposite side face to a seating face of the seat pad main body 121 (hereafter referred to as the back face), and integrated with the seat pad main body 121. The reinforcement member 122 comprises a non-woven fabric or the like.

A mold 101 as illustrated in FIG. 11 includes an upper mold 102 and a lower mold 103. The upper mold 102 and the lower mold 103 meet at respective peripheral edge portions. The symbol P in FIG. 11 indicates a parting line formed by joining together the respective mating faces of the peripheral edge portions of the upper mold 102 and the lower mold 103. The seat pad 120 (the seat pad main body 121) is molded with the seating face in a downward facing state inside a cavity 104 that is surrounded by the upper mold 102 and the lower mold 103. Namely, the back face of the seat pad 120 is molded by the cavity inner face of the upper mold 102, and the seating face and side peripheral faces of the seat pad 120 are molded by the cavity inner face of the lower mold 103.

When foam molding the seat pad 120, the reinforcement member 122 is disposed across the cavity inner face of the upper mold 102, and the reinforcement member 122 is fixed to the upper mold 102 by a fixing (omitted from the drawings) such as a pin or a magnet. Next, foamable synthetic resin raw material is supplied into the lower mold 103, the mold is closed, and the raw material is foamed. The seat pad main body 121 is molded, and the seat pad main body 121 and the reinforcement member 122 are integrated together, by foamed synthetic resin formed by foaming raw material filling the inside of the cavity 104. The seat pad 120, with the reinforcement member 122 integrally provided to the back face, is obtained by opening and removing from the mold, after the foamed synthetic resin has cured.

BACKGROUND ART

Patent Document 1: Japanese Patent Application Laid-Open (JP-A) No. 2010-29276

SUMMARY OF INVENTION

Technical Problem

It is desirable that the reinforcement member 122 is disposed up to a terminal end of the outer peripheral side of the back face of the seat pad main body 121, in order to evenly and sufficiently reinforce the seat pad 120 up to the terminal end side of the seating face thereof, and to make the outer edge portion of the reinforcement member 122 less liable to come away from the seat pad main body 121 due to deflection of the seat pad 120 when sat on, or the like.

However, the parting line P is present on the inner face of the cavity 104 of the mold 101, at a position corresponding to the terminal end of the outer peripheral side of the seat pad main body 121 back face. As a result, in cases in which the reinforcement member 122 is disposed up to the terminal end of the outer peripheral side of the seat pad main body 121 back face, a high level of attachment precision is required when attaching the reinforcement member 122 to the cavity inner face of the upper mold 102, making manufacturing operations of the seat pad 120 burdensome. Namely, in such cases, the outer peripheral edge of the reinforcement member 122 needs to be aligned with the parting line P when attaching the reinforcement member 122 to the cavity inner face of the upper mold 102. Suppose the attachment position of the reinforcement member 122 is misaligned, then there is a possibility of the reinforcement member 122 becoming trapped between the mating faces of the upper mold 102 and the lower mold 103 during mold fastening. In such cases, sealing at the parting line P after mold fastening becomes insufficient, with a possibility of molding defects occurring.

As a result, as illustrated in FIGS. 10, 11, the reinforcement member 122 is conventionally designed to be somewhat smaller than the back face of the seat pad main body 121, and the reinforcement member 122 is disposed such that the outer peripheral edge of the reinforcement member 122 is somewhat distanced from the parting line P toward the center side of the cavity inner face when attaching the reinforcement member 122 to the cavity inner face of the upper mold 102. The required attachment precision when attaching the reinforcement member 122 to the cavity inner face of the upper mold 102 is accordingly reduced, enabling the manufacturing operation of the seat pad 120 to be made relatively simple, and also enabling relatively simple prevention of the reinforcement member 122 becoming trapped between the respective mating faces of the upper mold 102 and the lower mold 103 during mold fastening. However, it is not possible to dispose the reinforcement member 122 up to the terminal end of the outer peripheral side of the seat pad main body 121 back face using this method.

Note that there is also a possibility of molding defects caused by the reinforcement member 122 becoming trapped in the parting line P occurring in cases in which the reinforcement member 122 is disposed so as to straddle positions corresponding to the parting line P on the outer face of the seat pad main body 121.

An object of the present invention is to provide a mold that enables manufacture of a molded foam body in which a reinforcement member is disposed up to a position on an outer face of a molded body main body corresponding to a parting line of a cavity inner face of the mold, and that enables prevention of molding defects caused by the reinforcement member becoming trapped in the parting line. A further object of the invention is to provide a manufacturing method of a molded foam body using the mold, and a molded foam body manufactured by the manufacturing method.

Solution to Problem

A mold of a first aspect is a mold for manufacturing a molded foam body including a molded body main body comprising a foamable synthetic resin, and a reinforcement member disposed across at least a portion of an outer face of the molded body main body and integrated with the molded body main body, wherein: the mold includes at least two molding molds, a cavity surrounded by the molding molds is formed by fastening the molding molds together, and a parting line is formed by joining mating faces of each of the molding molds together at an inner face of the cavity; when manufacturing the molded foam body, the reinforcement member is configured to be disposed across a cavity inner face of at least one of the molding molds prior to fastening the mold, and due to such placement, to be disposed so as to be adjacent to at least a portion of the parting line inside the cavity, the mold is then fastened, and the foamable synthetic resin raw material is foamed inside the cavity; a recessed step portion facing inside the cavity is provided at the mating face of at least one of the molding molds, at at least the portion of the parting line that is disposed adjacent to the reinforcement member; and the recessed step portion is configured such that the reinforcement member is able to escape inside the recessed step portion in a case in which the reinforcement member enters between the mating faces of the parting line during mold fastening.

A mold of a second aspect is the first aspect, wherein a width of the recessed step portion in an extension direction of the mating face, and in a direction towards and away from the cavity, is from 1 mm to 10 mm.

A mold of a third aspect is the first or second aspect, wherein: the reinforcement member comprises a non-woven fabric with a basis weight of from 0.05 kg/m$^2$ to 0.2 kg/m$^2$; and a depth of the recessed step portion from the mating face is from 0.2 mm to 3 mm.

A mold of a fourth aspect is any one of the first to the third aspect, wherein a seal member is provided more to an opposite side from the cavity side than the recessed step portion in order to seal between the mating faces.

A manufacturing method of a fifth aspect is a manufacturing method for manufacturing a molded foam body including a molded body main body formed from a foamable synthetic resin, and a reinforcement member disposed across at least a portion of an outer face of the molded body main body and integrated with the molded body main body, using the mold of any one of the first to the fourth aspect, the manufacturing method including: a reinforcement member placement process, in which the reinforcement member is disposed across the cavity inner face of at least one of the molding molds prior to fastening the mold, and when this placement is performed, disposing the reinforcement member so as to be adjacent to at least a portion of the parting line inside the cavity; and a foam molding process, in which the mold is fastened after the reinforcement member placement process, and the foamable synthetic resin raw material is foamed inside the cavity.

A manufacturing method for a molded foam body of a sixth aspect is the fifth aspect, wherein in the reinforcement member placement process, the reinforcement member is disposed such that an outer peripheral edge of the reinforcement member contacts the parting line, or such that a spacing between the outer peripheral edge of the reinforcement member and the parting line is 5 mm or less.

A molded foam body of a seventh aspect is a molded foam body including a molded body main body formed from a foamable synthetic resin, and a reinforcement member disposed across at least a portion of an outer face of the molded body main body and integrated with the molded body main body, wherein the molded foam body is manufactured by the manufacturing method for a molded foam body of the fifth or the sixth aspect.

A molded foam body of an eighth aspect is the seventh aspect, wherein the molded foam body is a seat pad.

Advantageous Effects of Invention

When manufacturing the molded foam body with reinforcement member using the mold of the first aspect, the reinforcement member is disposed across a cavity inner face of at least one of the molding molds prior to fastening, and the reinforcement member is disposed so as to be adjacent to at least a portion of the parting line inside the cavity when this placement is performed. The mold is then fastened, and the foamable synthetic resin raw material is foamed inside the cavity.

In the mold of the present invention, the recessed step portion facing the cavity inside is provided to the mating face of at least one of the molding molds, at at least the portion of the parting line where the reinforcement member is adjacently disposed, such that, suppose the reinforcement member enters between the mating faces of the parting line during mold fastening, the reinforcement member is able to escape inside the recessed step portion. This enables molding defects of the molded body main body caused by the reinforcement member becoming trapped in the parting line to be reliably prevented. As a result, this enables manufacture of the molded foam body disposed with the reinforcement member up to a position on the molded body main body outer face corresponding to the parting line of the cavity inner face of the mold, without occurrence of molding defects of the molded body main body.

In a seat pad employed as an general vehicle seat, for example, an acceptable range of an attachment margin of error of the reinforcement member is approximately 0 mm to 5 mm. In such cases, as in the second aspect, the width of the recessed step portion in the extension direction of the mating face of the molding mold, and in the direction towards and away from the cavity, is preferably from 1 mm to 10 mm. Such a configuration enables molding defects of the molded body main body caused by the reinforcement member becoming trapped in the parting line to be more reliably prevented, even when attachment error of the reinforcement member occurs within the acceptable range.

The depth of the recessed step portion from the mating face of the molding mold is suitably set according to the thickness of the reinforcement member used in the molded foam body. Note that, since it is generally difficult to unambiguously derive the thickness of the reinforcement member by actual measurement when a fabric material, such as a non-woven fabric, is used as the configuration material for the reinforcement member, it is preferable to set the depth of the recessed step portion according to the basis weight of the fabric material. Specifically, as in the third aspect, for example, in cases in which the reinforcement member is configured by a non-woven fabric with a basis weight of from $0.05$ $kg/m^2$ to $0.2$ $kg/m^2$, the depth of the recessed step portion is preferably from 0.2 mm to 3 mm. Such a configuration enables the reinforcement member to be sufficiently accommodated inside the recessed step portion, even when the reinforcement member enters between the mating faces of the parting line.

As in the fourth aspect, the seal member is further provided more to an opposite side from the cavity side than the recessed step portion in order to seal between the mating faces of the molding molds, thus enabling the sealing abilities of the parting line to be enhanced in cases in which the reinforcement member enters between the mating faces of the parting line.

The manufacturing method of a molded foam body of a fifth aspect is for manufacturing a molded foam body with reinforcement member using the mold of the present invention. As previously described, the manufacturing method of a molded foam body of the present invention accordingly enables manufacture of a molded foam body disposed with a reinforcement member up to a position on the outer face of the molded body main body corresponding to the parting line of the cavity inner face of the mold, without causing molding defects to occur on the molded body main body.

In the manufacturing method a molded foam body of the present invention, as in the sixth aspect, the reinforcement member is preferably disposed such that the spacing between the outer peripheral edge of the reinforcement member and the parting line is 5 mm or less. Disposing the reinforcement member in this way enables manufacture of the molded foam body disposed with the reinforcement member substantially up to the position on the outer face of the molded body main body corresponding to the parting line of the cavity inner face of the mold, while more reliably not inducing the occurrence of molding defects on the molded body main body.

In the molded foam body of the seventh aspect manufactured by the manufacturing method of a molded foam body of the present invention, occurrence of molding defects caused by the reinforcement member becoming trapped in the parting line of the molded body main body is prevented, and the reinforcement member is disposed up to the position on the outer face of the molded body main body corresponding to the parting line of the cavity inner face of the mold.

As in the eighth aspect, the present invention is suitable for application to a seat pad.

DESCRIPTION OF EMBODIMENTS

Explanation follows regarding exemplary embodiments, with reference to the drawings. Note that, although the following exemplary embodiments illustrate examples of application of the present invention to a mold for manufacturing a seat pad, and to a manufacturing method of a seat pad using the mold, the present invention is also applicable to a mold for manufacturing a molded foam body other than a seat pad, and to a manufacturing method for a molded foam body using the mold.

First Exemplary Embodiment

Figure 1:
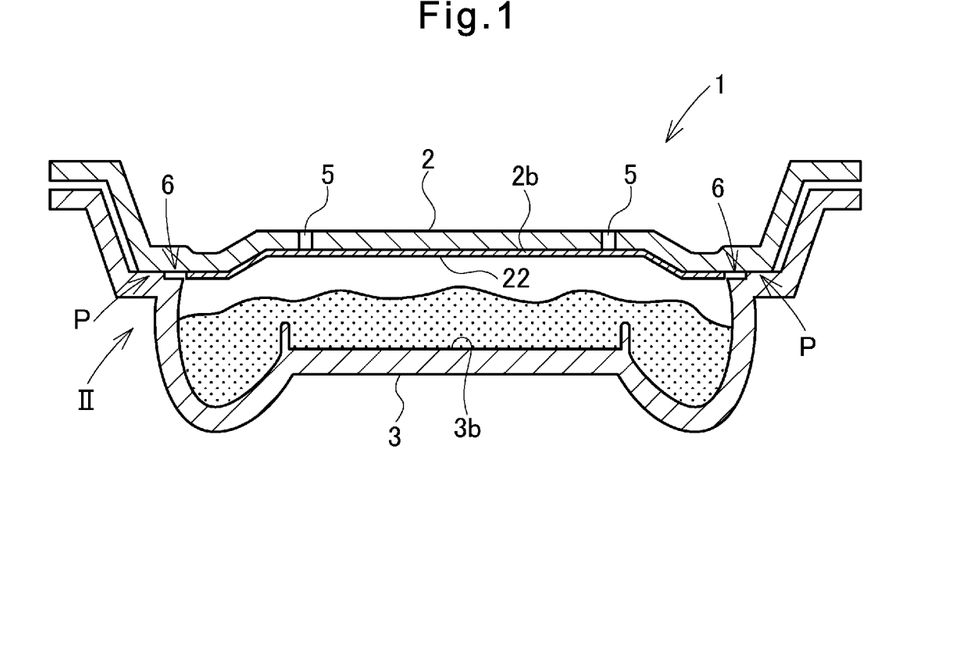
FIG. 1 is a cross-section view of a mold according to a first exemplary embodiment.
Figure 2:
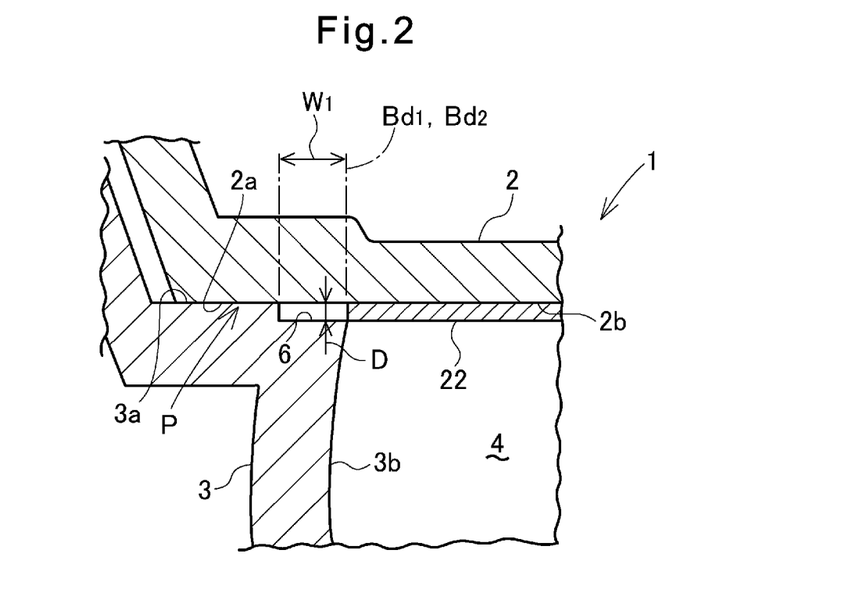
FIG. 2 is an expanded cross-section view of portion II in FIG. 1.
Figure 3:
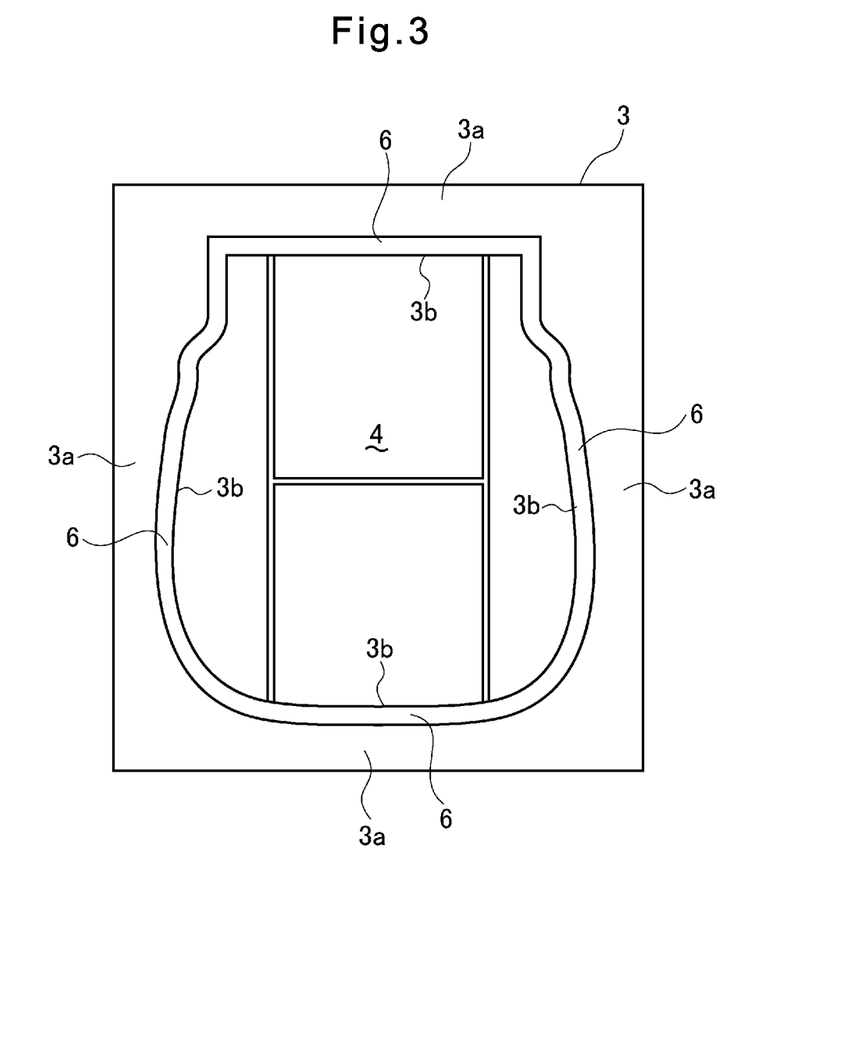
FIG. 3 is a plan view of a lower mold of the mold in FIG. 1.
Figure 4A:
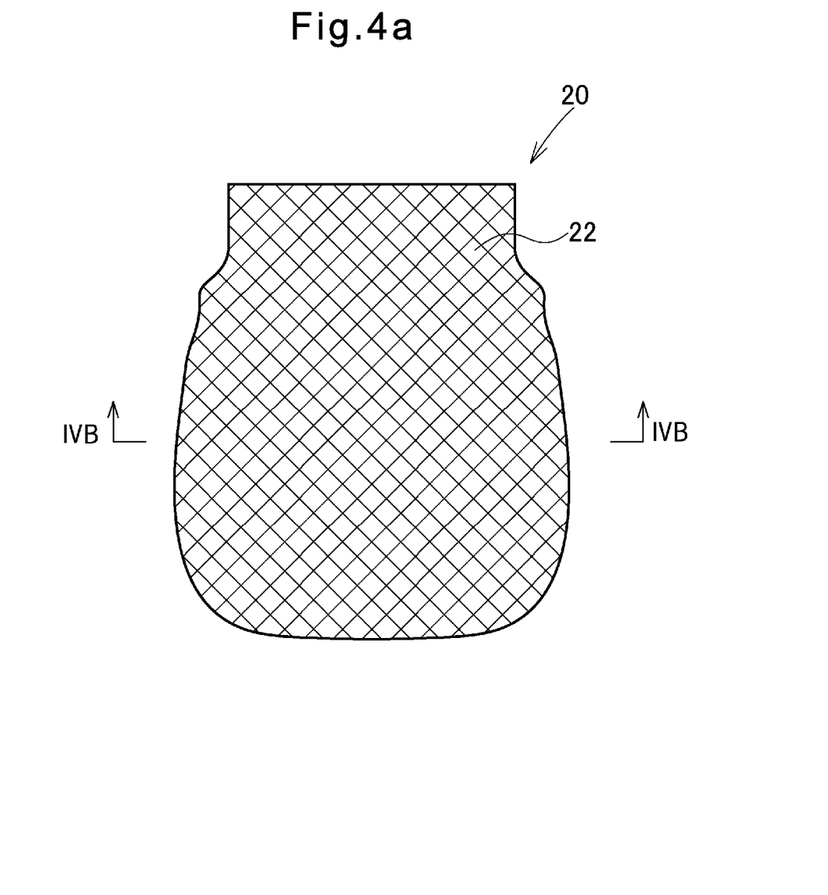
FIG. 4a is a back face view and FIG. 4b is a cross-section view of a seat pad as a molded foam body manufactured using the mold in FIG. 1.
Figure 4B:
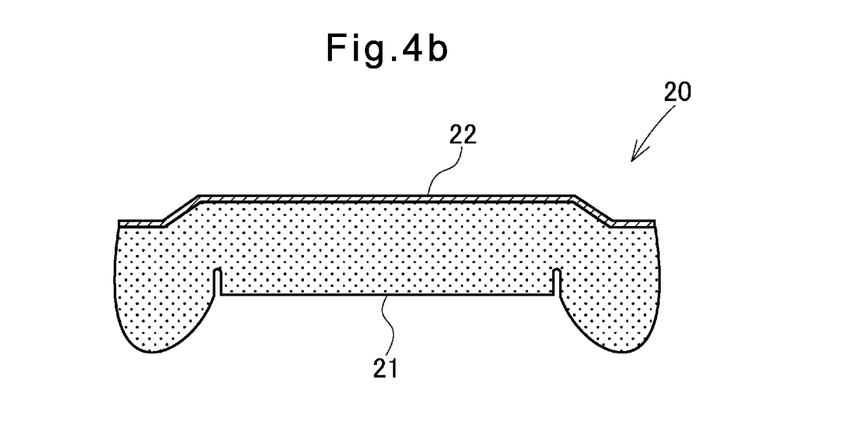
Figure 5A:
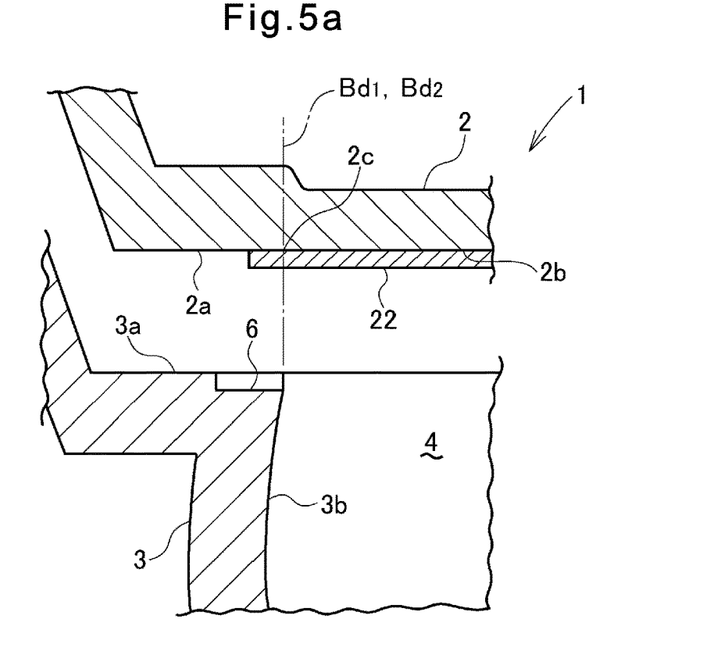
FIGS. 5a, 5b are enlarged cross-section views of the same portion as in FIG. 2 in a case in which a reinforcement member has entered a parting line of the mold in FIG. 1.
Figure 5B:
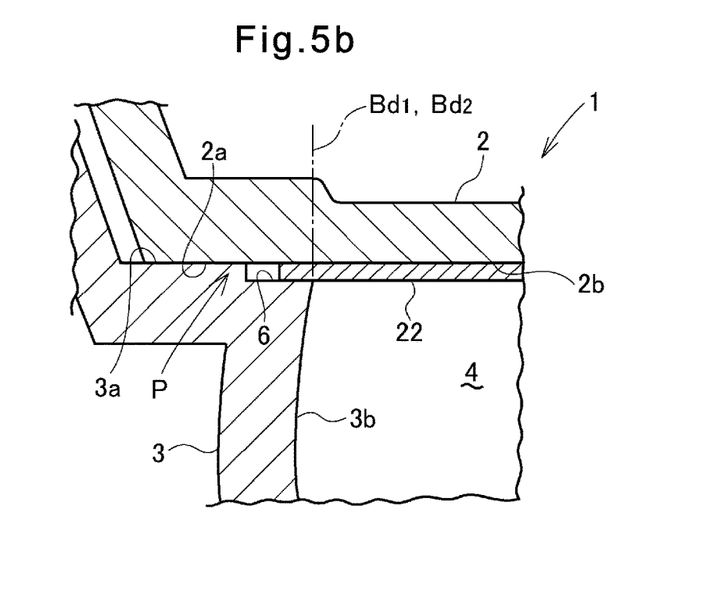

FIG. 1 is a cross-section view of a mold according to a first exemplary embodiment. FIG. 2 is an enlarged cross-section view of section II in FIG. 1. FIG. 3 is a plan view of a lower mold of the mold. FIG. 4a is a back face view of a seat pad as a molded foam body manufactured using the mold, and FIG. 4b is a cross-section view taken along line IVB-IVB in FIG. 4a. FIG. 5a and FIG. 5b are enlarged cross-section views of the same portion as illustrated in FIG. 2, in a case in which a reinforcement member has entered a parting line of the mold. FIG. 5a illustrates a state before mold fastening, and FIG. 5b illustrates a state after mold fastening.

In the present exemplary embodiment, a mold 1 serves to manufacture a seat pad 20 configuring a vehicle seat. Note that, although in the exemplary embodiment the seat pad 20 is a cushion pad configuring a seat section of a vehicle seat, the present invention is also applicable to a back pad configuring a backrest section of a vehicle seat. FIG. 1 illustrates a vertical cross-section along the left-right direction of the seat pad (cushion pad) 20 during use.

The seat pad 20 includes a seat pad main body 21 as a molded body main body formed from a foamable synthetic resin, such as polyurethane foam, and a reinforcement member 22 that is disposed across a back face of the seat pad main body 21 (the lower face of the seat pad main body 21 during use, since the seat pad 20 is a cushion pad in the exemplary embodiment) and integrated with the seat pad main body 21.

The reinforcement member 22 is disposed up to substantially the terminal end of the outer peripheral side of the back face of the seat pad main body 21. In the exemplary embodiment, as illustrated in FIGS. 4a, 4b, the reinforcement member 22 is configured in a shape covering substantially the entire back face of the seat pad main body 21, and the outer peripheral edge of the reinforcement member 22 is disposed so as to be aligned with the terminal end of the outer peripheral side of the back face of the seat pad main body 21 around the entire periphery. In the exemplary embodiment, a parting line P is present on the inner face of a cavity 4 of the mold 1, described below, at a position corresponding to the terminal end of the outer peripheral side of the back face of the seat pad main body 21. In the exemplary embodiment, the reinforcement member 22 is formed from an air permeable material. A non-woven fabric or the like is suitably applied as the air permeable material.

Note that the shape, disposition, configuration material, and the like of the reinforcement member 22 are not limited thereto. For example, the reinforcement member 22 may be configured in a shape so as to cover a portion of the back face of the seat pad main body 21, and a portion of the outer peripheral edge of the reinforcement member 22 may be disposed so as to be aligned with a portion of the outer peripheral side terminal end of the back face of the seat pad main body 21. The reinforcement member 22 may be disposed at a region of the outer face of the seat pad main body 21 other than the back face of the seat pad main body 21. The reinforcement member 22 may be disposed straddled across two or more faces out of the back face, side peripheral faces, and a seating face of the seat pad main body 21. The reinforcement member 22 may be configured of a material other than a non-woven fabric. An air permeable member may be disposed to the reinforcement member 22 at a region overlapping with exhaust holes 5 of the mold 1, described later.

In the present invention, "the reinforcement member 22 is disposed up to substantially the terminal end (=the position on the seat pad main body 21 outer face corresponding to the parting line P of the inner face of the cavity 4 of the mold 1, described later) of the outer peripheral side of the back face of the seat pad main body 21" indicates that, within a pre-set acceptable range of attachment error, the outer peripheral edge of the reinforcement member 22 may be positioned further to the center side of the back face than the outer peripheral side terminal end of the back face of the seat pad main body 21, or may protrude out from the outer peripheral side terminal end of the back face toward the sides of the seat pad main body 21.

In the exemplary embodiment, as illustrated in FIG. 1, the mold 1 includes an upper mold 2 and a lower mold 3, and exhaust holes 5 for discharging gas inside the cavity 4 surrounded by the upper mold 2 and the lower mold 3, to outside the cavity 4. Note that the mold 1 may also include a mold core (not illustrated in the drawings). In the exemplary embodiment, the upper mold 2 and the lower mold 3 are both equivalent to the molding molds of the first aspect. The upper mold 2 and the lower mold 3 mate together at respective peripheral edge portions. The symbol P indicates the parting line formed by joining together mating faces 2a, 3a (FIGS. 2, 3, 5a, 5b) of the peripheral edge portions of the upper mold 2 and the lower mold 3. Gas inside the cavity 4 is also discharged from the parting line P during foam molding.

In the exemplary embodiment, exhaust holes 5 are provided further to the center side of a cavity inner face 2b of the upper mold 2 than the parting line P. The exhaust holes 5 are disposed at portions of the cavity inner face 2b of the upper mold 2 where it is difficult to remove gas from the parting line P alone during foam molding, such as a portion at a higher position than the parting line P, or a portion where a location lower than the parting line P exists between the portion and the parting line P. FIG. 1 illustrates two exhaust holes 5 disposed at a spacing in the seat pad left-right direction, however the quantity and placement of the exhaust holes 5 are not limited thereto. Note that the exhaust holes 5 may also be disposed to the lower mold 3, or the like, if required.

The seat pad 20 (the seat pad main body 21) is molded in the cavity 4 of the mold 1 with the seating face facing downward. Namely, the seating face and side peripheral faces of the seat pad 20 are molded by a cavity inner face 3b of the lower mold 3, and the back face of the seat pad 20 is molded by the cavity inner face 2b of the upper mold 2. The parting line P is positioned at a boundary portion of the back face and the side peripheral faces of the seat pad 20, namely, at the outer peripheral side terminal end of the back face of the seat pad 20. Note that placement of the parting line P is not limited thereto, and may be disposed at a position corresponding to a location other than the outer peripheral side terminal end of the back face of the seat pad main body 21. Prior to the foam molding process of the seat pad 20, the reinforcement member 22 is disposed across the cavity inner face 2b of the upper mold 2, and the reinforcement member 22 is fixed to the upper mold 2 by a fixing (not illustrated in the drawings) such as pins or magnets. The outer peripheral edge of the reinforcement member 22 is disposed so as to be substantially aligned with the parting line P around the entire periphery when this occurs.

In the present invention, "the outer peripheral edge of the reinforcement member 22 is disposed so as to be substantially aligned with the parting line P around the entire periphery" indicates that, when attaching the reinforcement member 22 to the cavity inner face 2b of the upper mold 2, within the pre-set acceptable range of attachment error, the outer peripheral edge of the reinforcement member 22 may be positioned further to the center side of the cavity inner face 2b than a boundary portion $Bd_1$ between the cavity inner face 2b and the mating face 2a of the upper mold 2, or may protrude out from the boundary portion $Bd_1$ to the mating face 2a side (or, with the mold 1 in a fastened state, the peripheral edge portion of the reinforcement member 22 may cross the parting line P and overlap with the cavity inner face 3b of the lower mold 3).

In the exemplary embodiment, a recessed step portion 6 facing inside the cavity 4 is provided to the mating face 3a of the lower mold 3. The recessed step portion 6 is configured such that the reinforcement member 22 can escape inside the recessed step portion 6 in cases in which the reinforcement member 22 enters the parting line P (between the respective mating faces 2a, 3a). In the exemplary embodiment, the outer peripheral edge of the reinforcement member 22 is disposed so as to be adjacent to the parting line P around the entire periphery of the parting line P, and so the recessed step portion 6 is also formed around the entire periphery of the mating face 3a, as illustrated in FIG. 3.

As illustrated in FIG. 2, when the mold 1 has been fastened, a boundary portion $Bd_2$ between a bottom face of the recessed step portion 6 and the cavity inner face 3b of the lower mold 3, overlaps on the extension direction of the mating faces 2a, 3a with the previously described boundary portion $Bd_1$ between the mating face 2a and the cavity inner face 2b of the upper mold 2. Note that the respective boundary portions $Bd_1$, $Bd_2$ may be offset in the extension direction of the mating faces 2a, 3a when the mold 1 is in a fastened state.

A width $W_1$ of the recessed step portion 6 from the boundary portion $Bd_2$ in the extension direction of the mating faces 2a, 3a and the direction towards and away from the cavity 4 (FIG. 2; hereafter simply referred to as width $W_1$) is set as appropriate corresponding to the acceptable range of attachment error of the reinforcement member 22, pre-set for the seat pad 20 manufactured using the mold 1. For example, in order to configure the seat pad 20 as a common, ordinary vehicle seat, the acceptable range of attachment error of the reinforcement member 22 is approximately from 0 mm to 5 mm. In such cases, the width $W_1$ of the recessed step portion 6 is preferably from 1 mm to 10 mm, and particularly preferably from 5 mm to 10 mm.

A depth D from the mating face 3a to the recessed step portion 6 bottom face (FIG. 2; hereafter simply referred to as depth D) is set as appropriate according to the thickness of the reinforcement member 22 used in the seat pad 20. Note that, since it is generally difficult to unambiguously derive the thickness of the reinforcement member 22 by actual measurement when a fabric material, such as a non-woven fabric, is used as the configuration material for the reinforcement member 22, the depth D is preferably set according to the basis weight of the fabric material. Specifically, in cases in which the reinforcement member 22 is configured by a non-woven fabric, for example, when the basis weight of the non-woven fabric is from 0.05 kg/m² to 0.1 kg/m², the depth D is preferably from 0.2 mm to 0.5 mm and particularly preferably from 0.3 mm to 0.4 mm, and when the basis weight of the non-woven fabric is from 0.1 kg/m² to 0.2 kg/m², the depth D is preferably from 0.3 mm to 3 mm and particularly preferably from 0.4 mm to 0.5 mm.

Note that, although in the exemplary embodiment the recessed step portion 6 is provided to the mating face 3a of the lower mold 3, the recessed step portion 6 may be provided to the mating face 2a of the upper mold 2, or may be provided to both the mating faces 2a, 3a of the upper mold 2 and the lower mold 3, respectively.

Explanation follows regarding a procedure for manufacturing the seat pad 20 using the mold 1.

First, the upper mold 2 and the lower mold 3 are opened, the reinforcement member 22 is disposed across the cavity inner face 2b of the upper mold 2, and the reinforcement member 22 is fixed to the upper mold 2 by the fixing (a reinforcement placement process). In the exemplary embodiment, the reinforcement member 22 is disposed so as to cover the entire cavity inner face 2b of the upper mold 2, and the outer peripheral edge of the reinforcement member 22 is aligned around the entire periphery with the parting line P (the boundary portion $Bd_1$ between the cavity inner face 2b and the mating face 2a of the upper mold 2).

Next, foamable synthetic resin raw material is poured into the lower mold 3, the lower mold 3 and the upper mold 2 are fastened, and the raw material is foamed (a foam molding process). A foamed synthetic resin formed from the foamable raw material fills inside the cavity 4. When this placement is performed, gas inside the cavity 4 permeates through the reinforcement member 22 formed from an air permeable material, and is discharged from the cavity 4 through the exhaust holes 5. The seat pad main body 21 is formed, and the seat pad main body 21 and the reinforcement member 22 are integrated together by the foamable synthetic resin filling inside the cavity 4. After the foamed synthetic resin has cured, the mold is opened and removed. The seat pad 20 is then completed by surface finishing treatment of the seat pad 20, if required.

In the mold 1, on the respective mating faces 2a, 3a of the upper mold 2 and the lower mold 3, joined together at the parting line P that is disposed adjacent to the reinforcement member 22, the recessed step portion 6 facing the cavity 4 inside is provided at least to the mating face 3a of the lower mold 3. Suppose the reinforcement member 22 enters between the mating faces 2a, 3a during mold fastening, configuration is such that the reinforcement member 22 is able to escape inside the recessed step portion 6. This enables molding defects of the seat pad main body 21 caused by the reinforcement member 22 becoming trapped in the parting line P to be reliably prevented. This accordingly enables manufacture of the seat pad 20 disposed with the reinforcement member 22 up to a position on the seat pad main body 21 outer face corresponding to the parting line P of the cavity 4 inner face of the mold 1, without occurrence of molding defects of the seat pad main body 21.

As previously described, since the acceptable range of attachment error of the reinforcement member 22 is approximately from 0 mm to 5 mm for a seat pad 20 used in an ordinary vehicle seat, by setting the width of the recessed step portion 6 in the extension direction of the mating faces 2a, 3a, and the direction towards and away from the cavity 4, as from 1 mm to 10 mm, and preferably from 5 mm to 10 mm, as in the exemplary embodiment, molding defects of the seat pad main body 21 caused by the reinforcement member 22 becoming trapped in the parting line P can be more reliably prevented, even when there is attachment error of the reinforcement member 22 within the acceptable range.

In the exemplary embodiment, the reinforcement member 22 is configured from a non-woven fabric, and the depth D of the recessed step portion 6 is suitably set according to the basis weight of the non-woven fabric. Namely, when the basis weight of the non-woven fabric is from 0.05 kg/m² to 0.1 kg/m², the depth D is preferably from 0.2 mm to 0.5, and when the basis weight of the non-woven fabric is from 0.1 kg/m² to 0.2 kg/m², the depth D is preferably from 0.3 mm to 3 mm. Such a configuration enables the reinforcement member 22 to be sufficiently accommodated inside the recessed step portion 6, even when the reinforcement member 22 enters between the mating faces 2a, 3a.

Second Exemplary Embodiment

Figure 6A:
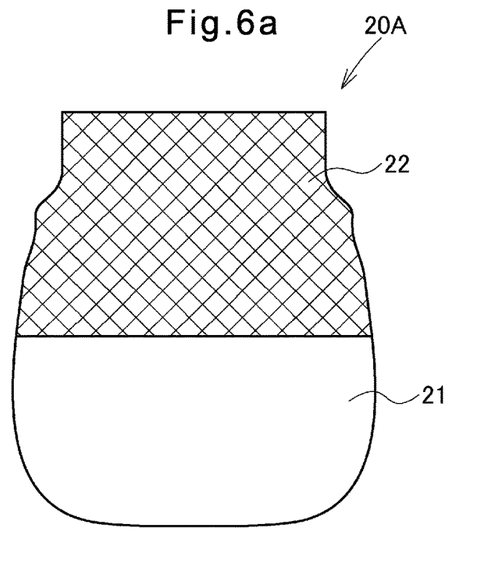
FIG. 6a is a back face view and FIG. 6b is a plan view of a seat pad illustrated in a second exemplary embodiment.
Figure 6B:
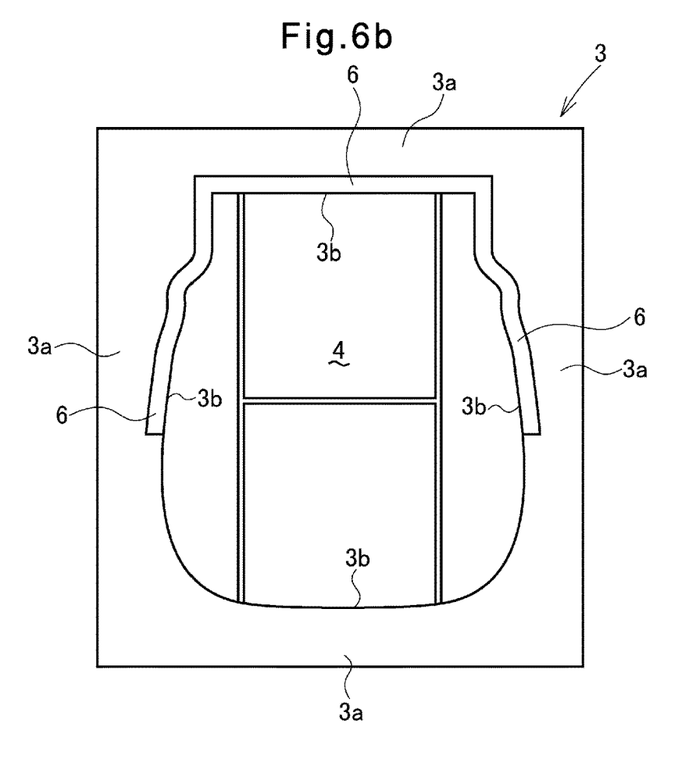

FIG. 6a is a back face view of a seat pad manufactured using a mold according to a second exemplary embodiment, and FIG. 6b is a plan view of a lower mold of the mold.

In the seat pad 20 of the first exemplary embodiment described above, the reinforcement member 22 is configured so as to cover substantially the entire back face of the seat pad main body 21, and when the reinforcement member 22 has been disposed across the cavity inner face 2b of the upper mold 2, the outer peripheral edge of the reinforcement member 22 is adjacent to the parting line P of the mold 1 around the entire periphery of the parting line P. As a result, the recessed step portion 6 serving as an escape for the reinforcement member is formed around the entire periphery of the parting line P in the first exemplary embodiment. However, in the present embodiment, the reinforcement member 22 may be configured so as to cover only a portion of the back face of a seat pad main body 21. In such a case, the recessed step portion 6 serving as an escape for the reinforcement member may be provided only to portions of the parting line P adjacent to the outer peripheral edge of the reinforcement member 22.

For example, in a seat pad 20A of the second exemplary embodiment, as illustrated in FIG. 6A, the shape of a reinforcement member 22 is configured so as to cover only a front-rear direction rear half side (hereafter simply referred to as the rear half side) of a back face of a seat pad main body 21 during use of the seat pad 20A, and the reinforcement member 22 is disposed up to the outer peripheral edge of the rear half side of the back face of the seat pad main body 21. As a result, when the reinforcement member 22 is disposed across a cavity inner face 2b of an upper mold 2 (omitted from FIG. 6B), the outer peripheral edge of the reinforcement member 22 is only adjacent to substantially the half-peripheral portion of the parting line P corresponding to the outer peripheral edge of the back face rear half side of the seat pad main body 21. Accordingly, in the exemplary embodiment, as illustrated in FIG. 6B, it is sufficient to provide a recessed step portion 6 to the parting line P only at substantially the half-peripheral portion rear half side adjacent to the outer peripheral edge of the reinforcement member 22.

It is preferable not to provide the recessed step portion 6 to the remaining portion of the parting line P that is not adjacent to the outer peripheral edge of the reinforcement member 22. This prevents unnecessary burring of the seat pad main body 21, or the like, from occurring.

Note that although, as illustrated in FIG. 6b, the recessed step portion 6 is provided to a mating face 3a of a lower mold 3 in the present exemplary embodiment, the recessed step portion 6 may be provided to the mating face 2a of the upper mold 2, or provided to both the mating faces 2a, 3a of the upper mold 2 and the lower mold 3, respectively.

Other configuration of the second exemplary embodiment is similar to the first exemplary embodiment.

Third Exemplary Embodiment

Figure 7A:
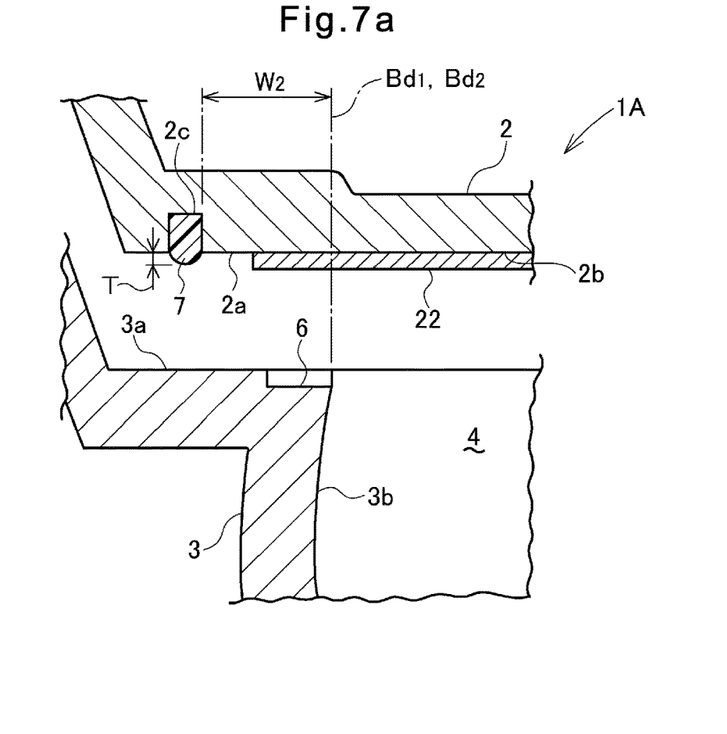
FIGS. 7a, 7b are enlarged cross-section views of the same portion as in FIG. 2 of a mold according to a third exemplary embodiment.
Figure 7B:
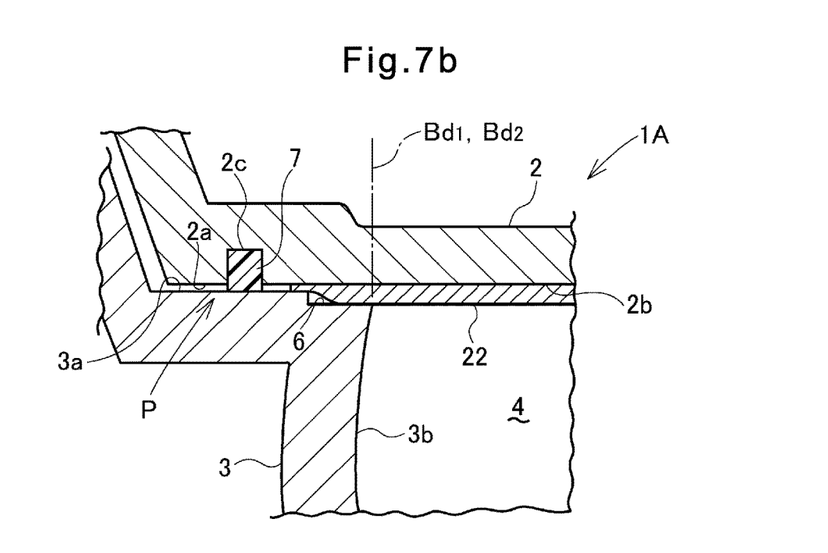
Figure 8:
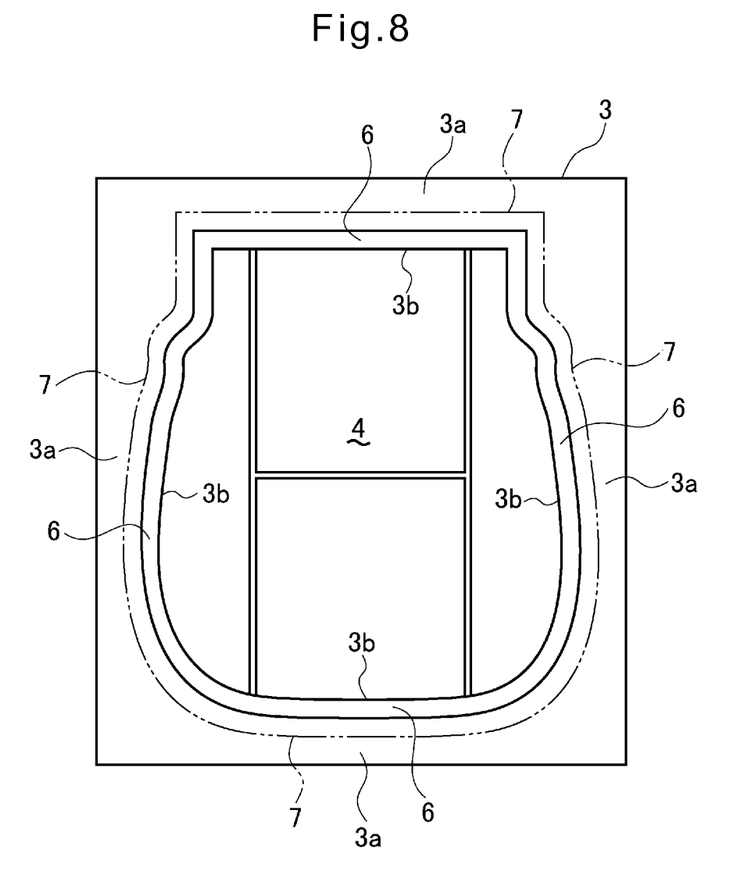
FIG. 8 is a plan view of a lower mold of the mold in FIGS. 7a, 7b.

FIGS. 7a, 7b are enlarged cross-section views of the vicinity of a parting line of a mold according to a third exemplary embodiment (a similar portion to that illustrated in FIG. 2). FIG. 7a illustrates a state before mold fastening, and FIG. 7b illustrates a state after mold fastening. Note that FIGS. 7a, 7b illustrate a case in which a reinforcement member has entered the parting line of the mold. FIG. 8 is a plan view of a lower mold of the mold.

A mold 1A of the present exemplary embodiment is provided with a seal member 7 more to an opposite side from a cavity 4 than a recessed step portion 6, in order to seal between mating faces 2a, 3a of an upper mold 2 and a lower mold 3, respectively. The seal member 7 is configured from an elastic material, such as rubber. Silicon rubber, fluorine rubber, nitrile rubber, or the like, is suitably applied as the seal member 7, but configuration is not limited thereto.

In the exemplary embodiment, a seal member attachment groove 2c is provided to the mating face 2a of the upper mold 2, and a base end side (the upper end side in FIGS. 7a, 7b) of the seal member 7 is fixed to the upper mold 2 by fitting into the seal member attachment groove 2c. In the exemplary embodiment, the seal member 7 is provided around the entire periphery of the mating face 2a of the upper mold 2. As illustrated in FIG. 7a, when the upper mold 2 and the lower mold 3 are in an opened state, a leading end side (the lower end side in FIGS. 7a, 7b) of the seal member 7 is in a state protruding from the mating face 2a of the upper mold 2 toward the lower mold 3 side. During mold fastening, the leading end side of the seal member 7 is pressed against the mating face 3a of the lower mold 3, and elastic close contact with the seal member 7 seals between the mating face 2a (the inner face of the seal member attachment groove 2c) of the upper mold 2 and the mating face 3a of the lower mold 3.

As illustrated in FIG. 7b, the seal member 7 is configured so as to be capable of sufficiently sealing between the mating faces 2a, 3a, even suppose a reinforcement member 22 enters a parting line P during mold fastening, and the reinforcement member 22 protrudes further to the cavity 4 outside than the recessed step portion 6 (although nearer to the cavity 4 side than the seal member 7) and is trapped between the mating faces 2a, 3a. Namely, in the exemplary embodiment, the reinforcement member 22 is permitted to be trapped between the mating faces 2a, 3a during mold fastening in a region, between the mating faces 2a, 3a, from the cavity 4 inner face to the seal member 7, and sufficient sealing is possible between the mating faces 2a, 3a even if the reinforcement member 22 has become trapped therein.

Similarly to the width $W_1$ of the recessed step portion 6, a distance $W_2$ (FIG. 7A) in the mating face 2a extension direction and the direction towards and away from the cavity 4, from a boundary portion $Bd_1$ between the mating face 2a and the cavity inner face 2b to the seal member 7 (namely, the width of an acceptable region for trapping the reinforcement member), is suitably set corresponding to the acceptable range of attachment error of the reinforcement member 22, pre-set for a seat pad 20 manufactured using the mold 1A. For example, in order to configure the seat pad 20 as a common ordinary vehicle seat, the acceptable range of attachment error of the reinforcement member 22 is approximately from 0 mm to 5 mm. In such cases, the width $W_2$ from the boundary portion $Bd_1$ to the seal member 7 is preferably from 1 mm to 10 mm, and particularly preferably from 5 mm to 10 mm.

Note that the seal member 7 may be disposed with a spacing toward the cavity 4 outside from the recessed step portion 6, or may be disposed adjacent to the recessed step portion 6. The spacing between the seal member 7 and the recessed step portion 6 is preferably from 0 mm to 10 mm, and particularly preferably from 3 mm to 5 mm.

Similarly to the depth D of the recessed step portion 6, a projection height T (FIG. 7a) of the seal member 7 from the mating face 2a with the mold in an opened state is suitably set according to the thickness of the reinforcement member 22. It is preferable to set the projection height T of the seal member 7 according to the fabric basis weight in cases in which a fabric material, such as a non-woven fabric, is used as the configuration material of the reinforcement member 22. Specifically, in cases in which the reinforcement member 22 is configured by a non-woven fabric, for example, when the basis weight of the non-woven fabric is from 0.05 $kg/m^2$ to 0.1 $kg/m^2$, the projection height T is preferably from 0.2 mm to 1.5 mm and particularly preferably from 0.5 mm to 0.8 mm, and when the basis weight of the non-woven fabric is from 0.1 $kg/m^2$ to 0.2 $kg/m^2$, the projection height T is preferably from 0.5 mm to 1.5 mm and particularly preferably from 0.8 mm to 1.2 mm.

Other configuration of the mold 1A is similar to the mold 1 of the first exemplary embodiment, and in FIGS. 7a, 7b, 8, the same reference numerals as FIGS. 1 to 5b indicate the same portions. Moreover, the method of manufacturing the seat pad 20 using the mold 1A is similar to when the mold 1 is used.

The mold 1A also exhibits similar advantageous effects to the mold 1 of the first exemplary embodiment.

In the mold 1A the seal member 7 is further provided more to the opposite side from the cavity 4 than the recessed step portion 6, in order to seal between the mating faces 2a, 3a of the upper mold 2 and the lower mold 3 respectively, thus enabling the sealing abilities of the parting line P to be enhanced in cases in which the reinforcement member 22 enters between the mating faces of the parting line P during mold fastening.

In the exemplary embodiment, the seal member 7 is configured so as to be capable of sufficiently sealing between the mating faces 2a, 3a, even if the reinforcement member 22 that has entered the parting line P protrudes further to the cavity 4 outside than the recessed step portion 6 (although nearer to the cavity 4 side than the seal member 7), and is trapped between the mating faces 2a, 3a. This enables molding defects of the seat pad main body 21 caused by the reinforcement member 22 becoming trapped in the parting line P to be sufficiently prevented, even when the attachment error of the reinforcement member 22 is somewhat large.

Fourth Exemplary Embodiment

Figure 9:
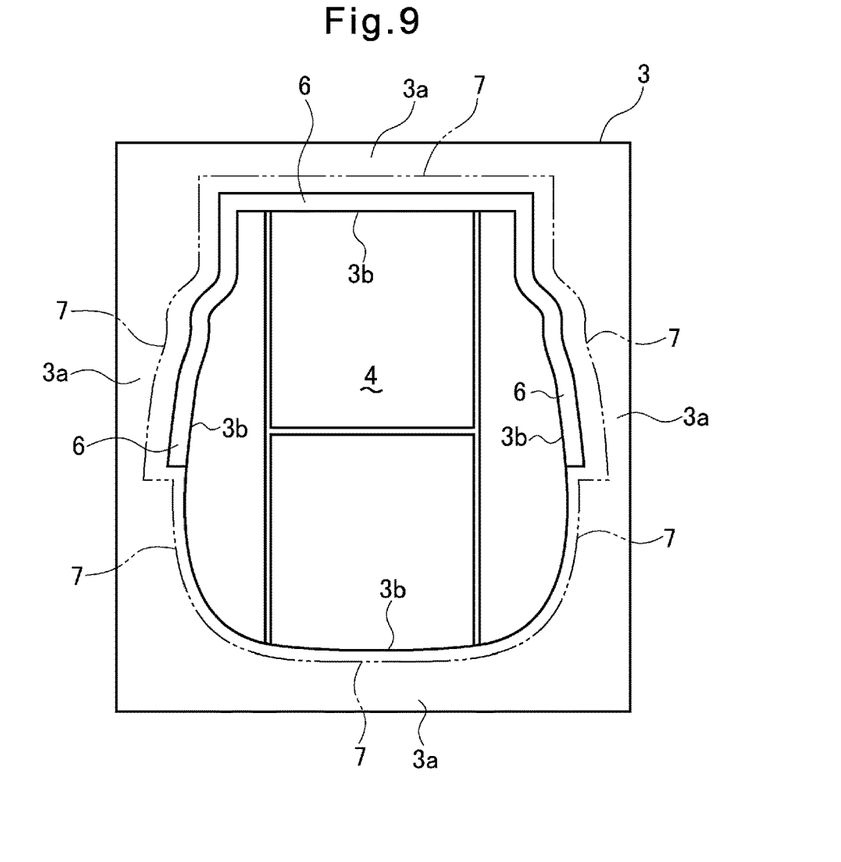
FIG. 9 is a plan view of a lower mold illustrated in a fourth exemplary embodiment.

FIG. 9 is a plan view of a lower mold of a mold according to a fourth exemplary embodiment.

As in the second exemplary embodiment previously described, a seal member 7 may also be provided more to the opposite side to the cavity 4 than the recessed step portion 6 in cases in which a reinforcement member 22 is only adjacent to a portion of a parting line P, and a recessed step portion 6 is only provided to the portion of the parting line P to which the reinforcement member 22 is adjacent.

In such cases, as illustrated in FIG. 9, it is also preferable that the seal member 7 is provided around the entire periphery of the parting line P. This enables sufficient sealing between mating faces 2a, 3a around the entire periphery of the parting line P, even suppose, for example, the reinforcement member 22 is only trapped in a portion of the parting line P. In such cases, the portion of the seal member 7 surrounding the recessed step portion 6 is preferably disposed such that the distance $W_2$ of an acceptable region for the reinforcement member to be trapped is within the suitable range described previously, and another portion of the seal member 7 (namely, the portion where the recessed step portion 6 is not present between the seal member 7 and the cavity 4 inner face) is preferably disposed at a position as near as possible to an edge portion of an inner peripheral side (the cavity 4 side) of the mating face 2a and/or the mating face 3a. This enables intrusion of the foamable synthetic resin into the parting line P at portions where the recessed step portion 6 is not provided to be prevented as far as possible, enabling occurrence of unnecessary burring of the seat pad main body 21, or the like, to be prevented.

Other configuration of the fourth exemplary embodiment is similar to that of the second and the third exemplary embodiment.

Each of the exemplary embodiments described above is merely an example of the present invention, and the present invention may be configured differently to the configurations illustrated.

For example, in each of the exemplary embodiments described above, an example is given of the present invention applied to a seat back pad, however the present invention is also applicable to a molded foam body other than a seat pad.

The present invention is not limited to the mating faces of an upper mold and a lower mold, and may be applied to all mating locations of a mold, such as between an upper mold and a mold core, or a lower mold and a mold core.

The present invention is explained in detail herein using specific embodiments, however it is obvious to a person skilled in the art than various modifications are possible without departing from the spirit and scope of the invention.

Note that the present application is based on Japanese Patent Application (No. 2012-028460) filed on Feb. 13, 2012, the entirety of which is incorporated by reference herein.

The invention claimed is:

1. A mold for manufacturing a molded foam body including a molded body main body comprising a foamable synthetic resin, and a reinforcement member disposed across at least a portion of an outer face of the molded body main body and integrated with the molded body main body, wherein:
   the mold includes at least an upper mold and a lower mold, a cavity surrounded by the upper mold and the lower mold is formed by fastening the upper mold and the lower mold together, and a parting line is formed by joining mating faces of each of the upper mold and the lower mold together at an inner face of the cavity;
   when manufacturing the molded foam body, the reinforcement member is configured to be disposed across a cavity inner face of the upper mold prior to fastening the mold, and due to such placement, to be disposed so as to be adjacent to at least a portion of the parting line inside the cavity;
   a recessed step portion facing inside the cavity is provided only at the mating face of the lower mold, is formed substantially parallel to and along the parting line, is distinguished from the cavity, at least a portion of the parting line that is disposed adjacent to the reinforcement member, and, in a fastened state of the mold, the recessed step portion forms a space between a bottom face of the recessed step portion and the mating face of the upper mold that forms the parting line, the mating face being a lowermost face of the upper mold; and
   the recessed step portion is configured such that the reinforcement member is configured to escape inside the recessed step portion in a case in which the reinforcement member enters between the mating faces of the parting line during mold the fastening.

2. The mold of claim 1, wherein a width of the recessed step portion in an extension direction of the mating face, and in a direction towards and away from the cavity, is from 1 mm to 10 mm.

3. The mold of claim 1, wherein:
   the reinforcement member comprises a non-woven fabric with a basis weight of from 0.05 kg/m$^2$ to 0.2 kg/m$^2$; and
   a depth of the recessed step portion from the mating face is from 0.2 mm to 3 mm.

4. The mold claim 1, wherein a seal member is provided more to an opposite side from the cavity side than the recessed step portion in order to seal between the mating faces.

5. The mold for manufacturing a molded foam body of claim 1, wherein the lowermost face of the upper mold, which forms the parting line, is in the same plane as the cavity inner face of the upper mold, which is located above the recessed step portion.

6. The mold for manufacturing a molded foam body of claim 1, wherein the mold consists of one upper mold and one lower mold.

7. A manufacturing method for manufacturing a molded foam body including a molded body main body formed from a foamable synthetic resin, and a reinforcement member disposed across at least a portion of an outer face of the molded body main body and integrated with the molded body main body, using the mold of claim 1, the manufacturing method comprising:
- a reinforcement member placement process, in which the reinforcement member is disposed across a cavity inner face of at least one molding mold prior to fastening the mold, and when this placement is performed, disposing the reinforcement member so as to be adjacent to at least a portion of the parting line inside the cavity; and
- a foam molding process, in which the mold is fastened after the reinforcement member placement process, and the foamable synthetic resin raw material is foamed inside the cavity.

8. The manufacturing method for a molded foam body of claim 7, wherein:
- in the reinforcement member placement process, the reinforcement member is disposed such that an outer peripheral edge of the reinforcement member contacts the parting line, or such that a spacing between the outer peripheral edge of the reinforcement member and the parting line is 5 mm or less.

* * * * *